(12) United States Patent
Ching (10) Patent No.: US 8,154,520 B2
(45) Date of Patent: Apr. 10, 2012

(54) HANDHELD ELECTRONIC COMMUNICATION DEVICE TRANSITIONABLE BETWEEN COMPACT AND EXPANDED CONFIGURATIONS

(75) Inventor: Leung Kwok Ching, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 1032 days.

(21) Appl. No.: 12/059,517

(22) Filed: Mar. 31, 2008

(65) Prior Publication Data
US 2009/0244011 A1 Oct. 1, 2009

(51) Int. Cl.
*G09F 3/02* (2006.01)
(52) U.S. Cl. ........ 345/169; 345/168; 345/170; 345/171; 345/172
(58) Field of Classification Search .......... 345/156–179, 345/184, 659, 903, 905; 455/566, 575.1; 400/485, 82, 489; 361/679.05–679.15; 715/767, 715/857, 851, 768
See application file for complete search history.

(56) References Cited

U.S. PATENT DOCUMENTS

| | | | | |
|---|---|---|---|---|
| 5,712,760 | A * | 1/1998 | Coulon et al. | 361/679.15 |
| 6,785,126 | B2 * | 8/2004 | Hazzard et al. | 361/679.09 |
| 6,982,658 | B2 * | 1/2006 | Guo | 341/28 |
| 7,187,957 | B2 * | 3/2007 | Kato | 455/575.3 |
| 7,336,979 | B2 * | 2/2008 | Soejima | 455/575.1 |
| 7,532,198 | B2 * | 5/2009 | Lazaridis et al. | 345/157 |
| 8,029,309 | B2 * | 10/2011 | Ou et al. | 439/374 |
| 2002/0163778 | A1 * | 11/2002 | Hazzard et al. | 361/683 |
| 2003/0039503 | A1 * | 2/2003 | Lin et al. | 400/472 |
| 2004/0062000 | A1 * | 4/2004 | Duarte | 361/683 |
| 2004/0095324 | A1 * | 5/2004 | Bricaud et al. | 345/167 |
| 2005/0091431 | A1 * | 4/2005 | Olodort et al. | 710/72 |
| 2005/0111172 | A1 * | 5/2005 | Wang | 361/680 |
| 2005/0125570 | A1 * | 6/2005 | Olodort et al. | 710/15 |
| 2005/0223340 | A1 * | 10/2005 | Repka | 715/851 |
| 2006/0158428 | A1 * | 7/2006 | Lazaridis et al. | 345/157 |
| 2006/0176279 | A1 * | 8/2006 | Bersenev et al. | 345/169 |

(Continued)

FOREIGN PATENT DOCUMENTS
EP 1798939 6/2007

OTHER PUBLICATIONS

Extended European Search Report dated Sep. 11, 2008. In corresponding application No. 08153840.7.

(Continued)

*Primary Examiner* — Prabodh M Dharia
(74) *Attorney, Agent, or Firm* — Fitch Even Tabin & Flannery, LLP (57) ABSTRACT

A handheld electronic communication device is disclosed that is transitionable between at least a compact configuration and expanded configuration. The handheld electronic communication device includes a display panel pivotally interconnected to a keyboard panel. The display panel can be overlaid on, and in substantial registration with, the keyboard panel in a compact configuration. Furthermore, the display panel can be offset above the keyboard panel in an expanded configuration. A pivot connection can be configured to couple and maintain the keyboard and display panels in substantial parallel orientation to each other in the compact and expanded configurations. The pivot connection includes an axis of rotation and is located in an upper corner of the handheld electronic communication device in the compact configuration. Additionally, a trackball navigation tool assembly is located at the upper corner of the handheld electronic communication device where the axis of rotation is located.

17 Claims, 7 Drawing Sheets

U.S. PATENT DOCUMENTS

2007/0188471 A1* 8/2007 Mak-Fan et al. .............. 345/167
2008/0051041 A1* 2/2008 Griffin et al. ................ 455/90.3

OTHER PUBLICATIONS

Examination Report dated Mar. 15, 2010. In corresponding application No. 08153840.7.
Sierra Wireless VOQ. http://www.voq.com/site/default.voq.Modified on Oct. 29, 2011; Retrieved on Nov. 3, 2011.
Motorola MPX. http://www.motorola.com/motoinfo/product/images/0,,48,00.html.Retrived from the internet on Nov. 3, 2011.
Motorola V70. http://www.phonescoop.com/phones/phone.php?p=92. Retrieved from the Internet Nov. 3, 2011.
Nokia 6800. http://www.nokia.com/nokia/0,,4486,00.html. Retrieved from the internet Nov. 3, 2011.
Danger hiptop. http://www.danger.com/consumers_hiptop2.php. Modified on Oct. 27, 2011. Retrieved from the internet on Nov. 3, 2011.
Siemens SK65. http://reviews.zdnet.co.uk/hardware/mobilephones/0,39023925,39162402,00.htm. Aug. 3, 2004.

* cited by examiner

HANDHELD ELECTRONIC COMMUNICATION DEVICE TRANSITIONABLE BETWEEN COMPACT AND EXPANDED CONFIGURATIONS

FIELD

The present disclosure, in a broad sense, is directed toward a handheld electronic device that has communication capabilities. The present disclosure further relates to providing a handheld electronic communication device that is capable of transitioning between compact and expanded configurations.

BACKGROUND

With the advent of more robust wireless communications systems, compatible handheld communication devices are becoming more prevalent, as well as advanced. Where in the past such handheld communication devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize all of the keyboard surface as efficiently as possible.

Many keyboards on mobile devices have an input device for navigation through the graphical user interface. These interfaces include such devices as trackballs and rotating wheels which can be used to affect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

Figure 1:
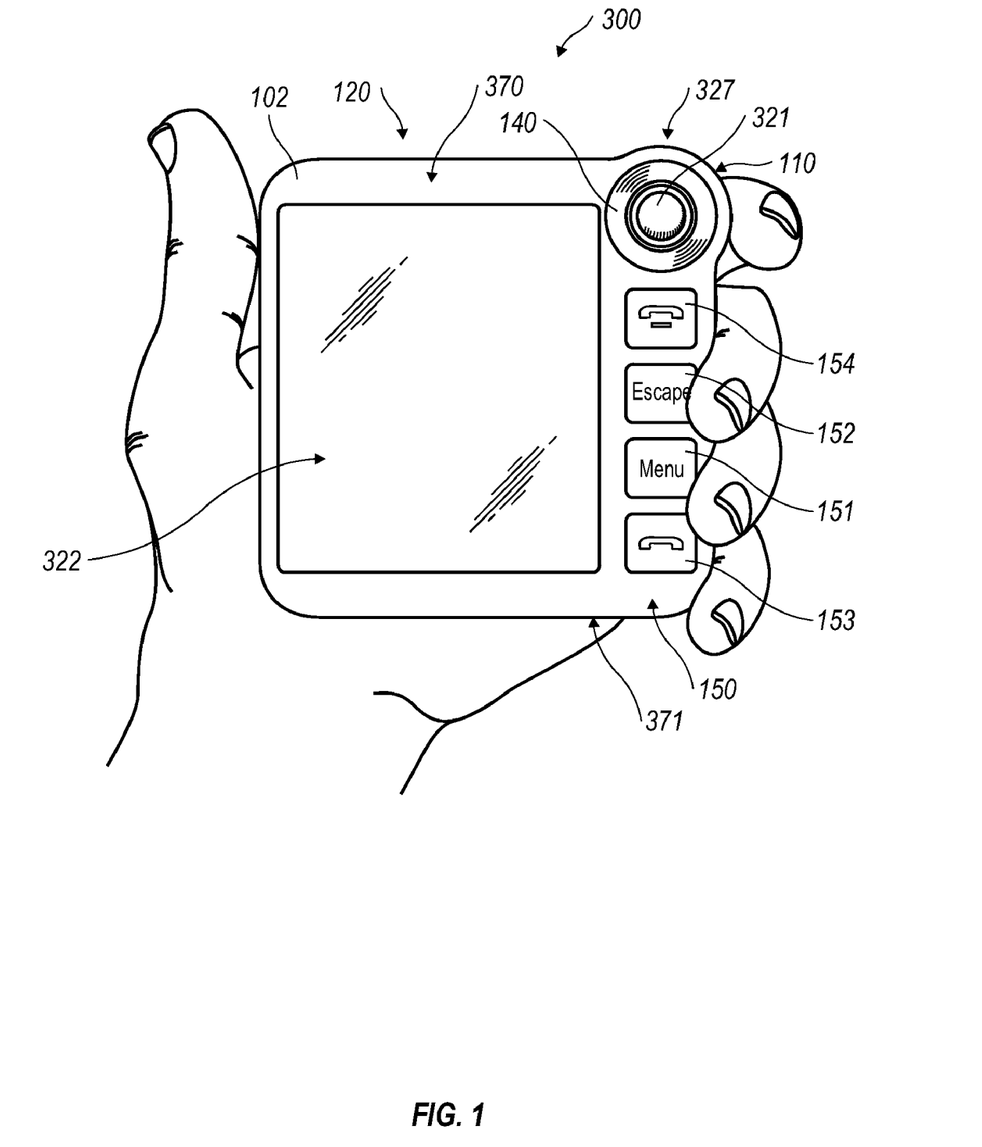
FIG. 1 illustrates an exemplary handheld electronic communication device in a compact configuration according to the present disclosure.
Figure 5:
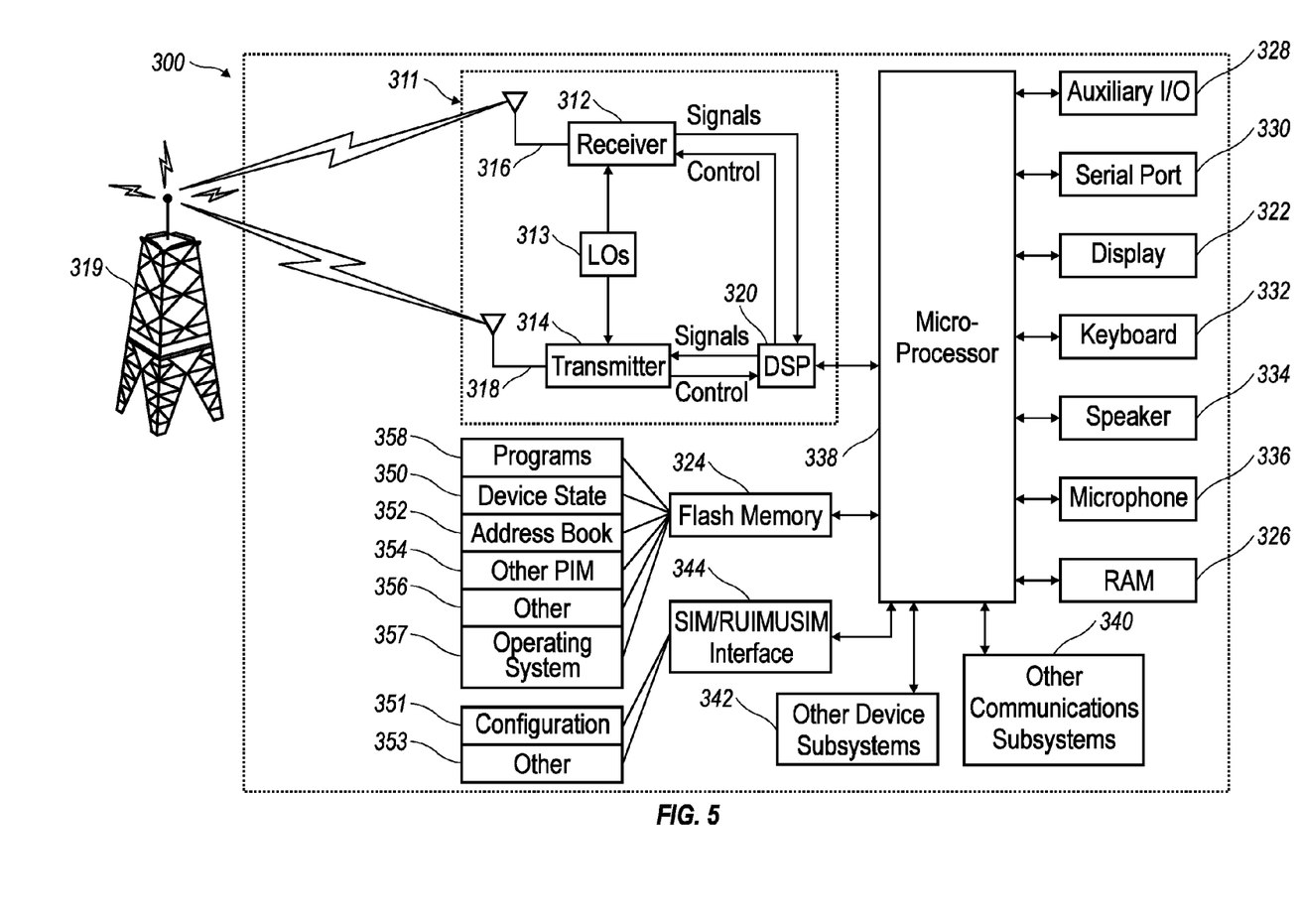
FIG. 5 is a block diagram representing a wireless handheld communication device interacting in a communication network.

An exemplary handheld electronic device 300 such as is shown in FIG. 1 and the device's cooperation in a wireless network 319 is exemplified in the block diagram of FIG. 5. These figures are exemplary only, and those persons skilled in the art will appreciate the additional elements and modifications necessary to make the handheld electronic communication device 300 work in particular network environments. While in the illustrated embodiment, the handheld electronic communication device 300 is a handheld wireless communication device, in other embodiments, the handheld electronic communication device 300 can be a personal digital assistant (PDA) or the like.

As shown in the block diagram of FIG. 5, the handheld electronic communication device 300 includes a microprocessor 338 that controls the operation of the handheld electronic communication device 300. A communication subsystem 311 performs all communication transmission and reception with the wireless network 319. Additionally, in at least one embodiment, the microprocessor 338 can be connected to a serial port (for example, a Universal Serial Bus port) 330 which can allow for communication with other devices or systems via the serial port 300. A display 322 can be connected to microprocessor 338 to allow for displaying of information to an operator of the device. When the handheld electronic communication device 300 is equipped with a keyboard 332, the keyboard can also be connected with the microprocessor 338. The handheld electronic communication device 300 can include a speaker 334, a microphone, 336, random access memory (RAM) 326, and flash memory 324 all of which may be connected to the microprocessor 338.

Other similar components may be provided on the handheld electronic communication device 300 as well and optionally connected to the microprocessor 338. Other communication subsystems 340 and other communication device subsystems 342 are generally indicated as being functionally connected with the microprocessor 338 as well. An example of a communication subsystem 340 is that of a short range communication system such as BLUETOOTH® communication module or a WI-FI® communication module (a communication module in compliance with IEEE 802.11b) and associated circuits and components. Additionally, the microprocessor 338 is able to perform operating system functions and enables execution of programs on the handheld electronic communication device 300. In some embodiments, not all of the above components may be included in the handheld electronic communication device 300. For example, in at least one embodiment the keyboard 332 is not provided as a separate component and is instead integrated with a touchscreen as described below.

Figure 2:
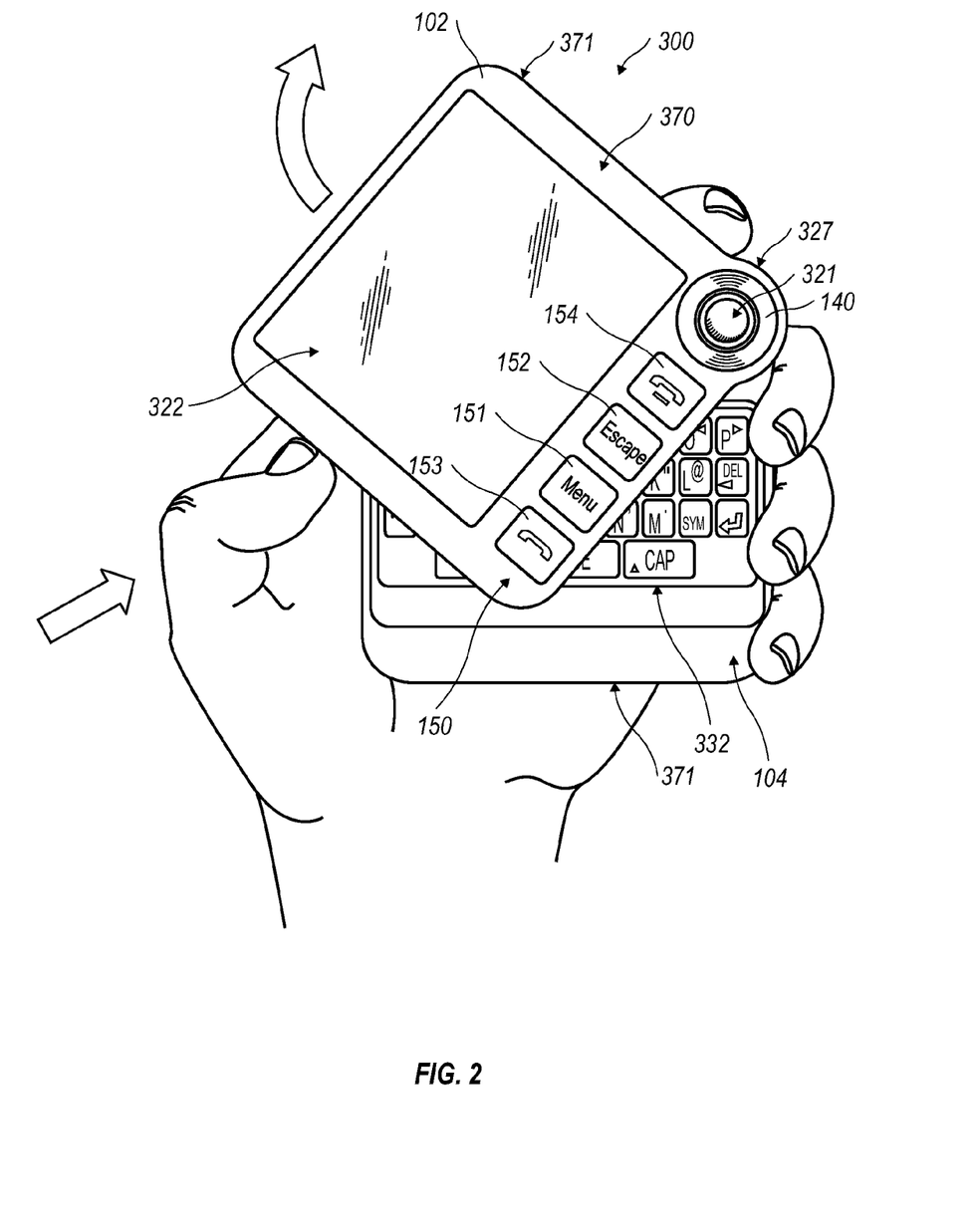
FIG. 2 illustrates the handheld electronic communication device of FIG. 1 in an intermediate transition state.
Figure 3:
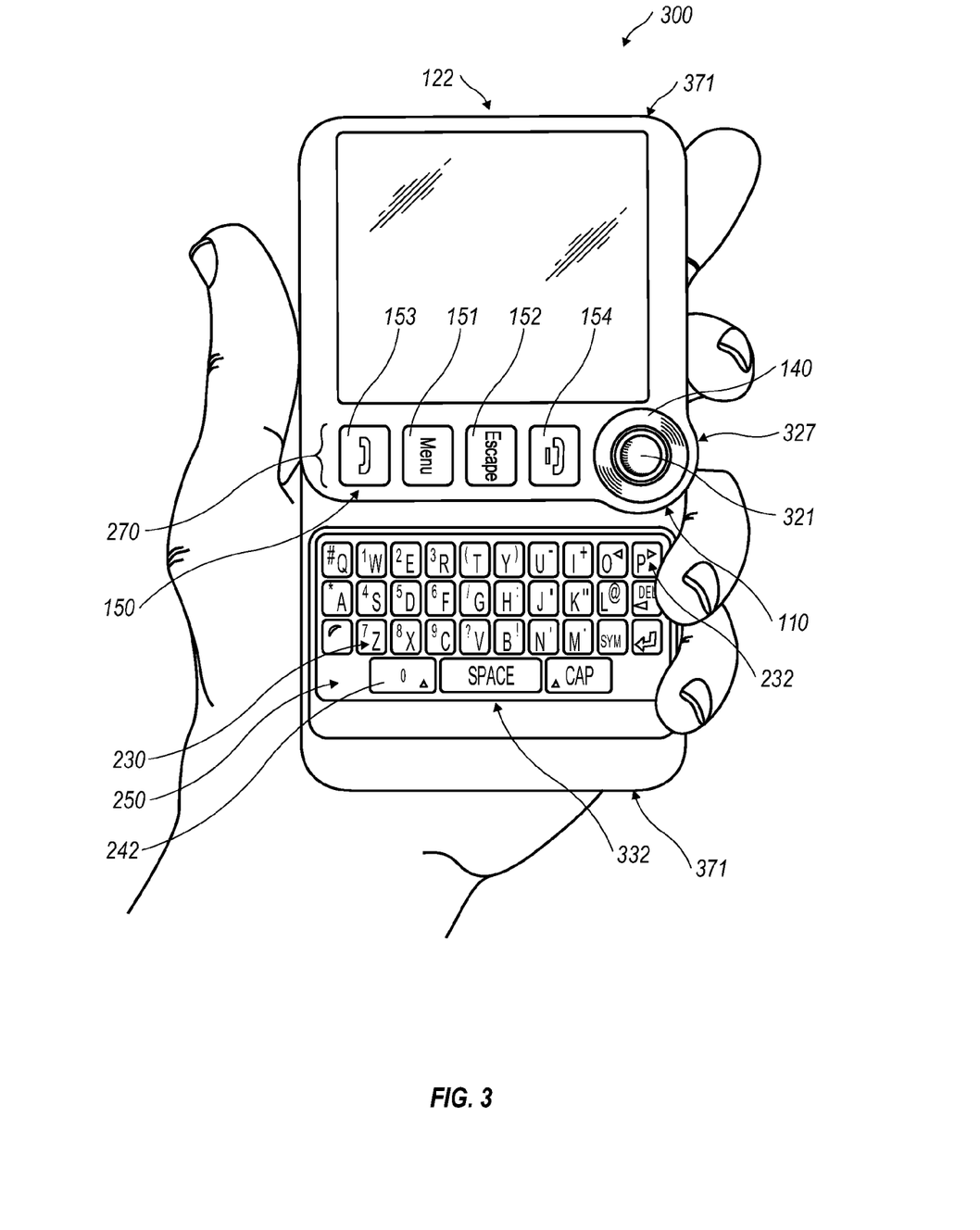
FIG. 3 illustrates the handheld electronic communication of FIG. 1 in an expanded configuration.

The auxiliary I/O subsystem 328 can take the form of a variety of different navigation tools (multi-directional or single-directional) such as a trackball navigation tool 321 as illustrated in the exemplary embodiment shown in FIG. 3, or a thumbwheel, a navigation pad, a joystick, touch-sensitive interface, or other I/O interface. These navigation tools may be located on the front face 370 of the display panel 102 (see FIGS. 1 and 2) or may be located on any exterior surface of the handheld electronic communication device 300. Other auxiliary I/O subsystems can include external display devices and externally connected keyboards (not shown). While the above examples have been provided in relation to the auxiliary I/O subsystem 328, other subsystems capable of providing input or receiving output from the handheld electronic communication device 300 are considered within the scope of this disclosure. Additionally, other keys may be placed along the sides of the handheld electronic communication device 300 to function as escape keys, volume control keys, scrolling keys, power switches, or user programmable keys, and may likewise be programmed accordingly.

Keys, typically of a push-button or push-pad nature, perform well as data entry devices but present problems to the user when they must also be used to effect navigational control over a screen-cursor. In order to solve this problem the present handheld electronic communication device 300 preferably includes an auxiliary input that acts as a cursor navigational tool and which is also exteriorly located upon the front face 370 of a display panel 102 of the handheld electronic communication device 300. The front face 370 location of the navigational tool is particularly advantageous because it makes the tool easily thumb-actuable. When the navigational tool is a trackball navigation tool assembly 327, the trackball 321 can be easily utilized to instruct two-dimensional screen cursor movement in substantially any direction, as well as act as an actuator when the trackball 321 is depressed like a button. Additionally, the location of the trackball 321 on the display panel 102 allows the trackball to be accessed in both the compact configuration of FIG. 1 and the expanded configuration of FIG. 3.

Furthermore, the handheld electronic communication device 300 can be equipped with components to enable operation of various programs, as shown in FIG. 5. In an exemplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 357 through a user interface usually including the keyboard 332 and display screen 322. While in an exemplary embodiment operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one exemplary embodiment, the flash memory 324 contains programs/applications 358 for execution on the handheld electronic communication device 300 including an address book 352, a personal information manager (PIM) 354, and the device state 350. Furthermore, programs 358 and other information 356 including data can be segregated upon storage in the flash memory 324 of the handheld electronic communication device 300.

When the handheld electronic communication device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, the CDMA (Code Division Multiple Access) network, the Evolution Data Only (EV-DO) network, High-Speed Packet Access (HSPA) network, the Universal Mobile Telecommunication Service Time Division Duplexing (UMTS-TDD) network, the Ultra Mobile Broadband (UMB) network, the Worldwide Interoperability for Microwave Access (WiMAX) network, and other networks that can be used for data and voice, or just data or voice. For the systems listed above, the handheld electronic communication device 300 must be properly enabled to transmit and receive signals from the communication network 319. Other systems may not require such identifying information. GPRS and EDGE use a Subscriber Identity Module (SIM) in order to allow communication with the communication network 319. Likewise, most CDMA systems use a Removable Identity Module (RUIM) in order to communicate with the CDMA network. Similarly, UMTS uses a Universal Subscriber Identity Module (USIM) in order to allow communication with the UMTS network. The SIM/RUIM/USIM card can be used in multiple different handheld electronic communication devices 300. The handheld electronic communication device 300 may be able to operate some features without a SIM/RUIM/USIM card, but it will not be able to communicate with the network 319. A SIM/RUIM/USIM interface 344 located within the handheld electronic communication device 300 allows for removal or insertion of a SIM/RUIM/USIM card (not shown). The SIM/RUIM/USIM card features memory and holds key configurations 351, and other information 353 such as identification and subscriber related information. With a properly enabled handheld electronic communication device 300, two-way communication between the handheld electronic communication device 300 and communication network 319 is possible.

If the handheld electronic communication device 300 is enabled as described above or the communication network 319 does not require such enablement, the two-way communication enabled handheld electronic communication device 300 is able to both transmit and receive information from the communication network 319. The transfer of communication can be from the handheld electronic communication device 300 or to the handheld electronic communication device 300. In order to communicate with the communication network 319, the handheld electronic communication device 300 in the presently described exemplary embodiment is equipped with an integral or internal antenna 318 for transmitting signals to the communication network 319. Likewise the handheld electronic communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the handheld electronic communication device 300.

When equipped for two-way communication, the handheld electronic communication device 300 features a communication subsystem 311. As is understood in the art, this communication subsystem 311 is modified so that it can support the operational needs of the handheld electronic communication device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the handheld electronic communication device 300 with the wireless network 319 can be any type of communication that both the wireless network 319 and handheld electronic device 300 are enabled to transmit, receive and process. In general, these can be classified as voice and data. Voice communication is communication in which signals for audible sounds are transmitted by the handheld electronic communication device 300 through the communication network 319. Data generally refers to all other types of communication that the handheld electronic communication device 300 is capable of performing within the constraints of the wireless network 319.

In some configurations, the handheld electronic communication device 300 may be standalone in that it does not connect to the "outside world". As discussed before, one example would be a PDA that stores such things as calendars and contact information but is not capable of synchronizing or communicating with other devices. In most situations such isolation will be viewed detrimentally in that synchronization is a highly desired characteristic of handheld devices today. Moreover, the utility of the handheld electronic communication device 300 is significantly enhanced when connectable within a communication system, and particularly when connectable on a wireless basis in a network 319 in which voice, text messaging, and other data transfer are accommodated.

To facilitate textual data entry into the handheld electronic device 300, an alphabetic keyboard is provided. In one version as illustrated in FIG. 3, a full alphabetic keyboard 332 is utilized in which there is one key per letter. In this regard, the associated letters can be advantageously organized in QWERTY, QWERTZ, AZERTY or Dvorak layouts, among others, thereby capitalizing on certain users' familiarity with these special letter orders. In order to stay within the bounds of the limited front surface area, however, each of the keys must be commensurately small when, for example, twenty-six keys must be provided in the instance of the English language.

Figure 4:
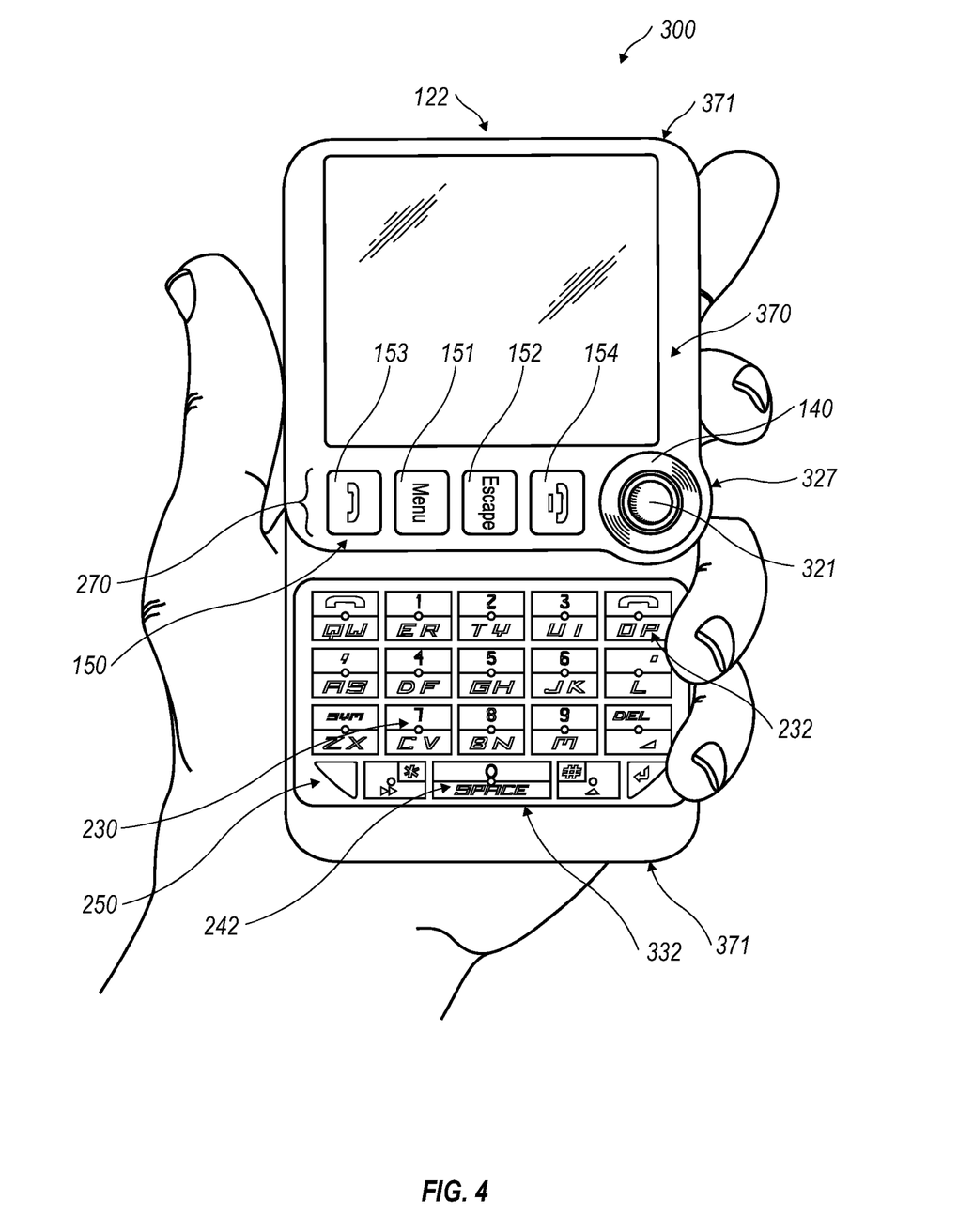
FIG. 4 illustrates another exemplary handheld electronic communication device in an expanded configuration with a reduced keyboard shown.

An alternative configuration is to provide a reduced keyboard in which at least some of the keys have more than one letter associated therewith (see FIG. 4 for an example). This means that fewer keys are required which makes it possible for those fewer keys to each be larger than in the instance when a full keyboard is provided on a similarly dimensioned handheld electronic communication device 300. Some users will prefer the solution of the larger keys over the smaller ones, but it is necessary that software or hardware solutions be provided in order to discriminate which of the several associated letters the user intends based on a particular key actuation, a problem the full keyboard avoids.

In at least one embodiment, the character discrimination is accomplished utilizing disambiguation software included on the handheld electronic communication device 300. To accommodate software use on the handheld electronic communication device 300, a memory 324 and microprocessor 338 are provided within the body of the handheld unit for receiving, storing, processing, and outputting data during use. Thus, certain software usually runs on the microprocessor 338 of these types of handheld electronic communication devices 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ing". Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regard to alphabetic characters, the different keyboard layouts identified below are selectively used based on a user's preference and familiarity; for example, the QWERTY keyboard layout is most often used by English speakers who have become accustomed to the key arrangement.

Therefore, the problem of needing a textual data input means is solved by the provision of either a full or reduced alphabetic keyboard 332 on the presently disclosed handheld electronic communication device 300. It should be further appreciated that the keyboard 332 can be alternatively provided on a touch sensitive screen in either a reduced or full format. While the illustrated embodiments present particular key arrangements it should be noted that other key arrangements are considered within the scope of this disclosure.

As shown in FIGS. 2 and 3, the handheld electronic communication device 300 is cradleable in the palm of a user's hand. The handheld electronic communication device 300 is provided with a keyboard 332 on the keyboard panel 104 to enter text data. The keyboard 332 includes a plurality of keys that can be of a physical nature such as actuable buttons or they can be of a software nature, typically constituted by virtual representations of physical keys on a display screen 322 (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 6A:
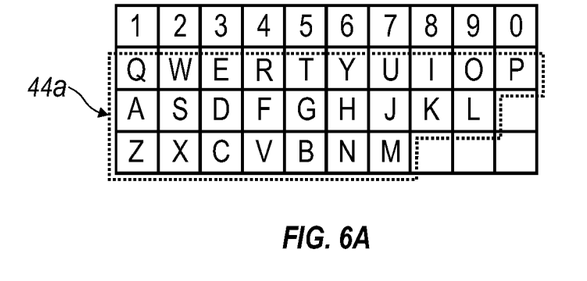
FIG. 6A illustrates an exemplary QWERTY keyboard layout.
Figure 6B:
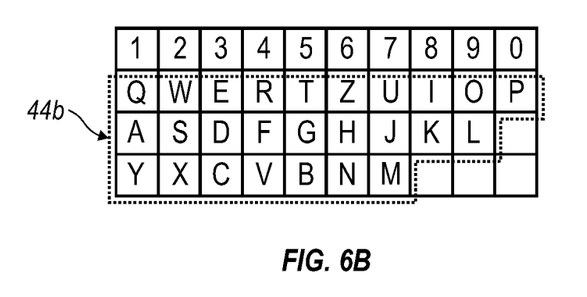
FIG. 6B illustrates an exemplary QWERTZ keyboard layout.
Figure 6C:
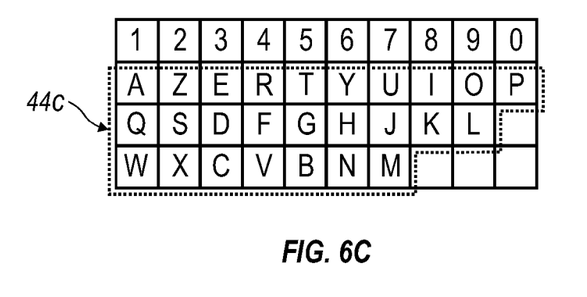
FIG. 6C illustrates an exemplary AZERTY keyboard layout.
Figure 6D:
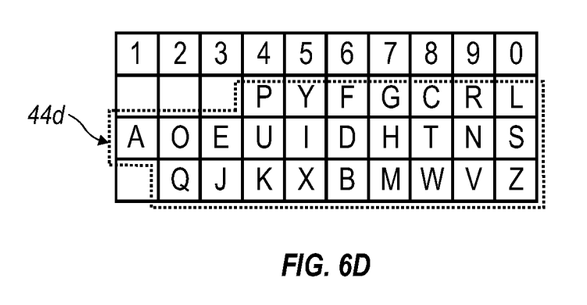
FIG. 6D illustrates an exemplary Dvorak keyboard layout.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 6A. The QWERTZ keyboard layout is normally used in German-speaking regions; this alphabetic key arrangement 44b is shown in FIG. 6B. The AZERTY keyboard layout 44c is normally used in French-speaking regions and is shown in FIG. 6C. The Dvorak keyboard layout was designed to allow typists to type faster; this alphabetic key arrangement 44d is shown in FIG. 6D.

Figure 7:
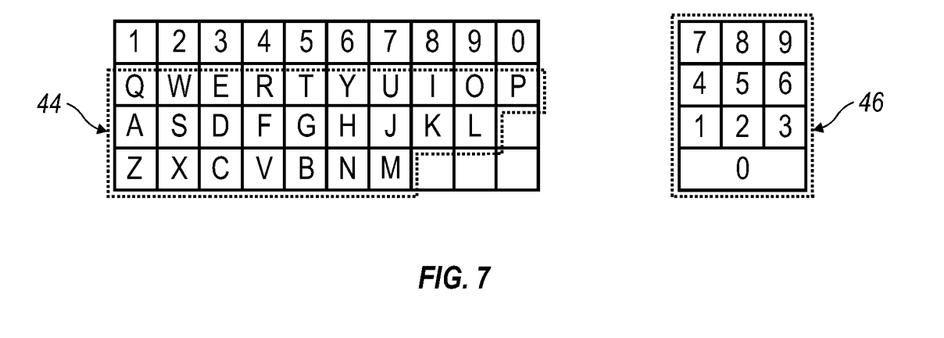
FIG. 7 illustrates a QWERTY keyboard layout paired with a traditional ten-key keyboard.

Alphabetic key arrangements are often presented along with numeric key arrangements. Typically, the numbers 1-9 and 0 are positioned in the row above the alphabetic keys 44a-d, as shown in FIG. 6A-D. Alternatively, the numbers share keys with the alphabetic characters, such as the top row of the QWERTY keyboard. Yet another exemplary numeric key arrangement is shown in FIG. 7, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 8.

Figure 8:
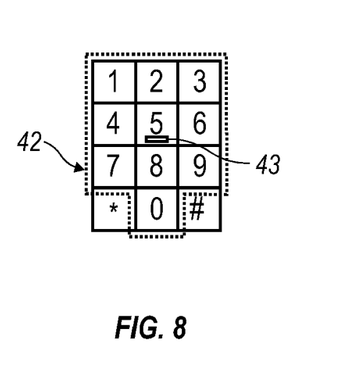
FIG. 8 illustrates ten digits comprising the numerals 0-9 arranged in a traditional, ITU Standard E.161 numeric telephone keypad layout, including the * and # flanking the zero.

As shown in FIG. 8, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic communication devices 300 to include a combined text-entry keyboard and a telephony keyboard. Examples of such handheld electronic communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic communication device 300 having a full keyboard, the alphabetic characters are singly associated with the plurality of physical keys. Thus, in an English-language keyboard of this configuration, there are at least 26 keys in the plurality so that there is at least one key for each letter.

Figure 9:
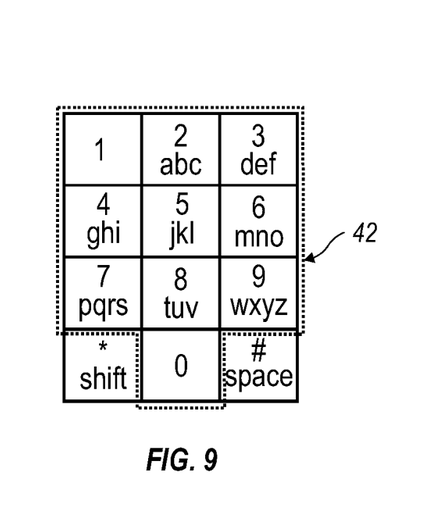
FIG. 9 illustrates a traditional or standard phone key arrangement or layout according to the ITU Standard E.161 including both numerals and letters.

FIGS. 8 and 9 both feature numeric keys arranged according to the ITU Standard E. 161 form. In addition, FIG. 9 also incorporates alphabetic characters according to the ITU Standard E. 161 layout as well.

The handheld electronic communication device 300 can be arranged such that it is transitionable between at least a compact configuration 120 and an expanded configuration 122. An exemplary illustration of the compact configuration 120 is shown in FIG. 1. FIG. 2 illustrates the handheld electronic communication device transitioning from the compact configuration 120 to the expanded configuration 122. Additionally, an exemplary expanded configuration 122 is shown in FIG. 3.

As illustrated in FIGS. 1 and 2, a display panel 102 can be interconnected to a keyboard panel 104. The display panel 102 is overlaid on and in substantial registration with the keyboard panel 104 when the handheld electronic communication device 300 is in the compact configuration 120. The display panel can be provided with a display screen 322 among other components. In at least one embodiment, the display screen 322 can be a touch sensitive display screen. The touch sensitive display screen can be one of the above described display screens that is capable of detecting touch activation on the display screen 322.

The display panel 102 is coupled to the keyboard panel 104 by a pivot connection 110 configured to maintain the display panel 102 and the keyboard panel 104 in substantial parallel orientation to each other in the compact configuration 120, expanded configuration 122 and during the transition between the compact configuration 120 and expanded configuration 122. The pivot connection 110 comprises an axis of rotation and is located in an upper corner of the handheld electronic communication device 300 in the compact configuration 120. The axis of rotation is oriented substantially perpendicular to the display panel 102 and the keyboard panel 104.

In the illustrated embodiment of FIG. 1, the handheld electronic communication device 300 is arranged to be right-hand operable with the pivot connection 110 located in a top right-hand corner of the handheld electronic communication device 300 in the compact configuration. However, in another embodiment, the handheld electronic communication device 300 can be configured to be left-hand operable with the pivot connection 110 located in a top left-hand corner of the handheld electronic communication device 300 in the compact configuration 120 (not illustrated). As illustrated the handheld electronic communication device 300 is sized to fit in the hand of the operator. In at least one embodiment, the handheld electronic communication device 300 is sized such that its width is about five centimeters. In other embodiments, the width of the handheld electronic communication device 300 is between about three centimeters and seven centimeters.

The trackball navigation tool assembly 327 as described above can also be located at the upper corner of the device at which the axis of rotation is located. In at least one embodiment the trackball navigation tool assembly 327 further comprises a spherical trackball 321 having a center point substantially aligned with the axis of rotation of the pivot connection 110. The front face of the display panel 102 adjacent to the trackball 321 can be contoured such that the portion closer to trackball 321 is recessed as compared to the rest of the front face 370 of the display panel 102. Alternatively, the front face 370 of the display panel 102 adjacent the trackball 321 can be described as contoured downward toward the trackball. In another embodiment, the trackball navigation tool assembly 327 is located beneath a cover 140 that is contoured downward toward the trackball 321.

In at least one embodiment, the display panel 102 can be shaped such that the side edges of the display panel 102 immediately adjacent to the trackball 321 are in conformance with the trackball 321. In at least the illustrated embodiment, the exterior side surface of the display panel 102 is formed along a radius extending from the center point of the trackball 321. The radius can be offset from the side edges of the display panel 102 or it can be shaped such that the sides of the display panel 102 are tangential to the radius extending from the center point of the trackball 321. The keyboard panel 104 can likewise be shaped in one of the above described ways.

The handheld electronic communication device 300 can be arranged such that it presents a substantially square front profile in the compact configuration 120. While the device as illustrated in FIG. 1 presents a substantially square front profile, other profiles are considered within the scope of this disclosure, including but not limited to a rectangular front profile, circular front profile, and polygonal front profile. The display screen 322 can be the same or a different shape as compared to the front profile of the device in the compact configuration 120. In the illustrated embodiment, the display screen 322 is rectangular in shape.

In at least one embodiment, the display panel 102 includes additional components that are mounted on the front face 370 of the display panel 102 or along one of the sides of the display panel 102. For example, the display panel 102 can be provided with a trackball 321 and at least one key 150. The at least one key 150 can be radially aligned with the center point of the trackball 321. The at least one key can be a menu key 151, an escape key 152, a call key 153, and a call end key 154, among others. While in the illustrated embodiments, four keys are provided, it is contemplated that more or fewer keys can be provided as well. Furthermore, the at least one key need not be provided in a radial direction from the center point of the trackball 321. Rather the at least one key can be located on a proximate side of the front face 370 of the display panel 102. While the keys illustrated in at least FIG. 1. are of identical shape and size, other embodiments are contemplated that have keys of varying size and shape.

When the operator desires to use the expanded configuration of the handheld electronic communication device 300, the operator rotates the display panel 102 about the axis of rotation associated with the pivot connection 110. If the handheld electronic communication device 300 is configured for right-hand operation, the operator rotates the display panel in a clockwise direction about the axis of rotation. As illustrated the keys 150 are located on the right-hand side of the handheld electronic communication device 300 in the compact configuration 120. As the operator rotates the display panel 102, the device passes through a transitional state much like that as illustrated in FIG. 2.

The pivot connection 110 and the trackball 321 can be substantially aligned so that the trackball 321 is located substantially above the pivot connection 110. In this configuration, the space required for the trackball 321 is minimized allowing for the remaining interior of the housings 371 to be used for other components. Furthermore, the co-location of the trackball 321 with the pivot connection 110 provides a visual indicator to the operator of the location for the pivot connection, whereby the operator is informed of the location of the pivot connection 110.

Figure 10:
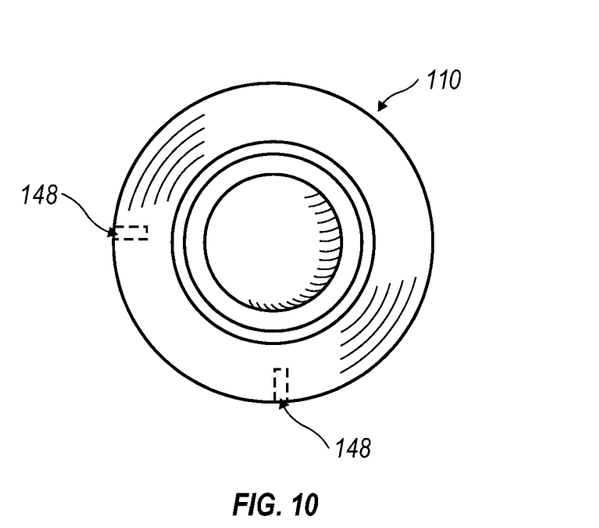
FIG. 10 illustrates a top view of the pivot connection with stops.

The pivot connection 110 is a mechanism that provides for rotation of the display panel 102 relative to the keyboard panel 104. In at least one embodiment illustrated in FIG. 10, the pivot connection 110 is provided with stops 148 which prevent the rotation of the display panel 102 beyond a certain point relative to the keyboard panel 104. For instance, the pivot connection 110 can be arranged such that when the handheld electronic communication device 300 is in the compact configuration 120 the stop 148 prevents the rotation of the display panel 102 in a counter-clockwise direction. Likewise, a stop 148 within the pivot connection 110 can prevent the rotation of the display panel 102 in a clockwise direction, when the handheld electronic communication device 300 is in the expanded configuration. In other embodiments, the stops 148 can be arranged in the opposite direction as described above. The arrangement of the stops 148 can be dependent upon whether left or right handed operation is desired as well. The stops 148 can be provided within the pivot connection 110, on the display panel 102, on the keyboard panel 104, or some combination thereof. Thus, in at least one embodiment, the pivot connection 110 can further include at least one stop 148 to align the display panel 102 substantially above the keyboard panel 104 in a compact configuration 120. Similarly, the pivot connection 110 can further include at least one stop 148 to align the display panel 102 offset above the keyboard panel 104.

When the handheld electronic communication device 300 is positioned in expanded configuration, the front face of the keyboard panel 104 is exposed to the operator of the device. Thus, when the handheld electronic communication device 300 has finished its transition to the expanded configuration 122, the display panel 102 is offset above the keyboard panel 104, as illustrated in FIG. 3. In this configuration the handheld electronic communication device 300 is arranged so that when the operator is entering data on the keyboard 332, the hands of the operator will not obstruct vision of the display screen 322.

The keyboard 332 of the handheld electronic communication device 300 can be configured to one of the above described layouts. The keyboard 332 can be described as comprising keyfield 250 in which alphanumeric keys 230, alphabetic keys 232, numeric keys 242, and other function keys are presented as illustrated in FIG. 3. As illustrated in FIG. 3, the alphabetic keys 232 and alphanumeric keys 230 are arranged such that the letters associated therewith are in a QWERTY layout having one letter per key. The numerals associated with the alphanumeric keys 230 and numeric keys 242 are arranged according to the ITU Standard E1.61 and can be at least partially overlaid on the keys of the keyboard 332 bearing alphabetic characters. The co-location of the alphabetic and numeric arrangements in the familiar QWERTY and telephone arrangement provide an easy way for operators to find the appropriate key for numeric or alphabetic entry.

The handheld electronic communication device 300 can be arranged such that it presents a substantially rectangular front profile in the expanded configuration 122. While the device as illustrated in FIG. 3 presents a substantially rectangular front profile, other profiles are considered within the scope of this disclosure.

In the illustrated embodiment of FIG. 4, a reduced keyboard 332 is presented on the keyboard panel 104 below the display panel 102. In this arrangement, a reduced number of keys are provided on the keyboard 332 as compared to a standard arrangement, such as the one of FIG. 3. The reduced arrangement such as the one illustrated in FIG. 4 can be provided by having at least some keys with more than one alphabetic letter associated therewith. This may provide a user interface that is more conducive to single handed typing on the handheld electronic communication device 300. Similar to the keyboard illustrated in FIG. 3, the keyboard 332 of FIG. 4 can be described as comprising keyfield 250 in which alphanumeric keys 230, alphabetic keys 232, numeric keys 242, and other function keys are presented as illustrated in FIG. 3. As illustrated in FIG. 4, the alphabetic keys 232 and alphanumeric keys 230 are arranged such that the letters associated therewith are in a QWERTY layout and at least one key has more than one letter per key. As illustrated, the majority of keys with alphabetic characters have more than one alphabetic character associated therewith. The numerals associated with the alphanumeric keys 230 and numeric keys 242 are arranged according to the ITU Standard E1.61 and can be at least partially overlaid on the keys of the keyboard 332 bearing alphabetic characters. The co-location of the alphabetic and numeric arrangements in the familiar QWERTY and telephone arrangement provide an easy way for operators to find the appropriate key for numeric or alphabetic entry.

While the above illustrated embodiments have focused on the QWERTY layouts, other layouts such as the ones described above could be implemented instead. Additionally, in some embodiments, the keyboard can be provided through a program executing on the microprocessor 338 of the handheld electronic communication device 300. In these embodiments, the keyboard 332 is provided on the keyboard panel via an additional display screen or other similar component. When the keyboard is provided via a program executing on the microprocessor, the keyboard can be changed by the operator based upon a desired layout for the alphabetic keys. For example, a person speaking French might find the AZERTY layout more familiar and request that layout be shown as the keyboard. Likewise, the keyboard could be configured accordingly to a currently executing application.

Exemplary embodiments have been described hereinabove regarding both handheld electronic communication devices 300, as well as the communication networks 319 within which they cooperate. Again, it should be appreciated that the focus of the present disclosure is a handheld electronic communication device 300 with a trackball navigation tool assembly 327 and a pivot connection 110 are located in an upper corner of the handheld electronic communication device 300. Various modifications to and departures from the disclosed embodiments will occur to those having skill in the art. The subject matter that is intended to be within the spirit of this disclosure is set forth in the following claims.

What is claimed is:

1. A handheld electronic communication device transitionable between at least compact and expanded configurations, said handheld electronic communication device comprising:
    a display panel pivotally interconnected to a keyboard panel, wherein said display panel is overlaid on, and in substantial registration with, said keyboard panel in the compact configuration and said display panel is offset above said keyboard panel in the expanded configuration;
    said display panel coupled to said keyboard panel by a pivot connection configured to maintain said display panel and keyboard panel in substantial parallel orientation to each other in the compact and expanded configurations and during transition between the compact and expanded configurations, said pivot connection comprises an axis of rotation and is located in an upper corner of the handheld electronic communication device in the compact configuration and said axis of rotation is oriented substantially perpendicular to said display panel and keyboard panel; and
    a navigation tool assembly located at the upper corner of the handheld electronic communication device at which said axis of rotation is located.

2. The handheld electronic communication device as recited in claim 1, wherein said navigation tool assembly further comprises a spherical trackball having a center point substantially aligned with the axis of rotation of the pivot connection.

3. The handheld electronic communication device as recited in claim 1, wherein the handheld electronic communication device presents a substantially square front profile in the compact configuration.

4. The handheld electronic communication device as recited in claim 1, wherein the handheld electronic communication device presents a substantially rectangular front profile in the expanded configuration.

5. The handheld electronic communication device as recited in claim 1, wherein the handheld electronic communication device is right-hand operable with the pivot connection located in a top right-hand corner of the handheld electronic communication device in the compact configuration.

6. The handheld electronic communication device as recited in claim 1, wherein the handheld electronic communication device is left-hand operable with the pivot connection located in a top left-hand corner of the handheld electronic communication device in the compact configuration.

7. The handheld electronic communication device as recited in claim 2, wherein a front face of the handheld electronic communication device adjacent said trackball is contoured downward toward the trackball.

8. The handheld electronic communication device as recited in claim 2, further comprising a cover surrounding the trackball, wherein the cover is contoured downward toward the trackball.

9. The handheld electronic communication device as recited in claim 1, wherein said display panel includes a touch sensitive display screen.

10. The handheld electronic communication device as recited in claim 1, wherein said keyboard panel has a keyboard comprising a plurality of alphabetic keys with one alphabetic letter per alphabetic key.

11. The handheld electronic communication device as recited in claim 1, wherein said keyboard panel has a keyboard comprising a plurality of alphabetic keys wherein a majority of said plurality of alphabetic keys have more than one alphabetic letter per alphabetic key.

12. The handheld electronic communication device as recited in claim 2, wherein said display panel further comprises at least one key radially aligned with a center point of the trackball.

13. The handheld electronic communication device as recited in claim 12, wherein said at least one key is located on a proximate side of a front face of the display panel.

14. The handheld electronic communication device as recited in claim 13, wherein said at least one key is a menu key.

15. The handheld electronic communication device as recited in claim 13, wherein said at least one key is an escape key.

16. The handheld electronic communication device as recited in claim 13, wherein said at least one key is a call key.

17. The handheld electronic communication device as recited in claim 1, wherein said pivot connection further comprises at least one stop to align the display panel substantially above said keyboard panel in the compact configuration.

* * * * *